Figure 1:
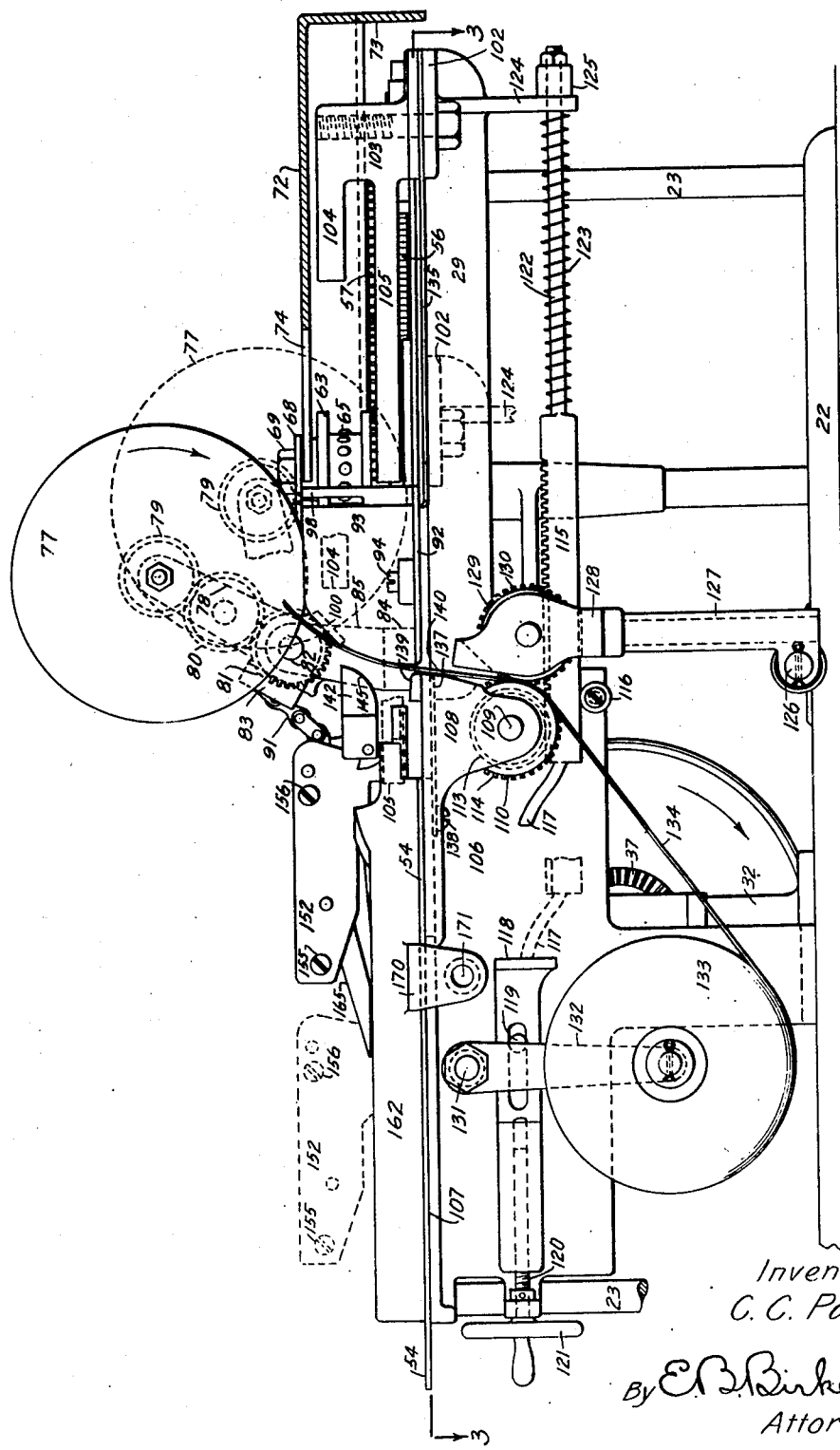

May 26, 1931.  C. C. PAGE  1,807,045
CANDY WRAPPING MACHINE
Filed March 29, 1926.  7 Sheets-Sheet 1

Inventor
C. C. Page
By E. B. Birkenbeul
Attorney

May 26, 1931.   C. C. PAGE   1,807,045
CANDY WRAPPING MACHINE
Filed March 29, 1926   7 Sheets-Sheet 2

Inventor
C. C. Page
By C. L. Birkenbeul.
Attorney

May 26, 1931.  C. C. PAGE  1,807,045
CANDY WRAPPING MACHINE
Filed March 29, 1926   7 Sheets-Sheet 4

Inventor
C. C. Page
By E. B. Birkenbeuel
Attorney

May 26, 1931.                C. C. PAGE                 1,807,045
                         CANDY WRAPPING MACHINE
                     Filed March 29, 1926    7 Sheets-Sheet 5

Inventor
C. C. Page
By E. B. Birkenbeuel.
Attorney

May 26, 1931. C. C. PAGE 1,807,045
CANDY WRAPPING MACHINE
Filed March 29, 1926 7 Sheets-Sheet 6
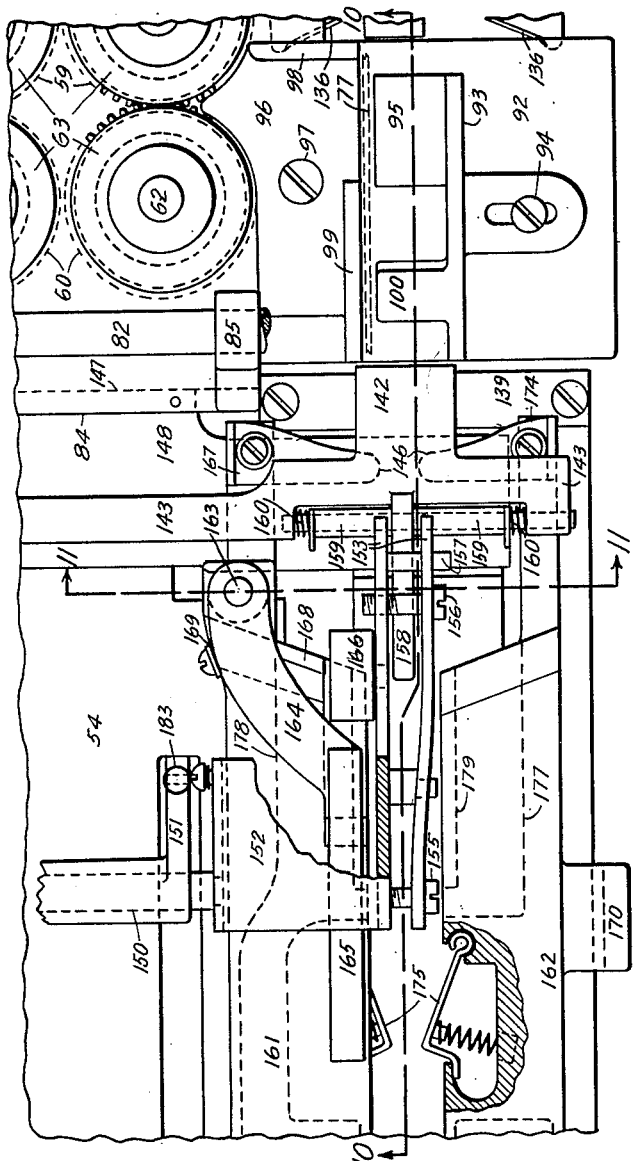
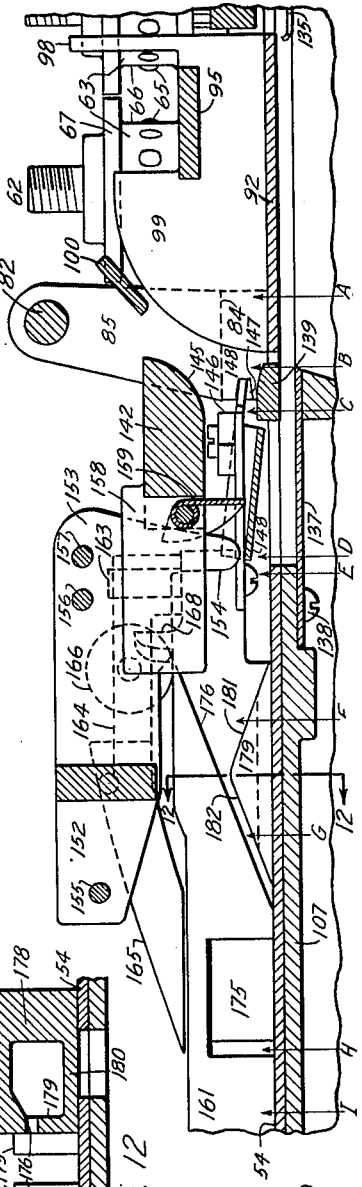
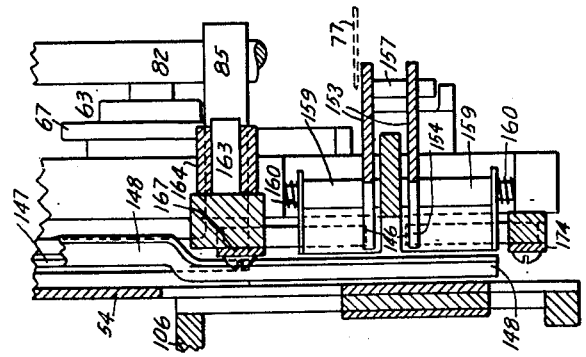
Inventor
C. C. Page
By E. B. Birkenbeul.
Attorney Inventor
C. C. Page
By E. B. Birkenbeuel.
Attorney Patented May 26, 1931

1,807,045

UNITED STATES PATENT OFFICE

CLARENCE C. PAGE, OF PORTLAND, OREGON

CANDY WRAPPING MACHINE

Application filed March 29, 1926. Serial No. 98,105.

This invention relates generally to the art of candy making, and particularly to the forming and wrapping of candies in cubical or oblong form.

The first object of this invention is to provide an exceedingly simple and efficient machine for forming and wrapping cubical and oblong candies of varying dimensions from pulled goods or caramel stock in strip form.

The second object is to so construct the machine that it will form, feed, cut and wrap such candies.

The third object is to so construct the machine that it can be operated by inexperienced and inexpensive labor.

The fourth object is to make it possible to easily and quickly change the machine over from one size of wrapping to any other size within the limits of the machine.

The fifth object is to so construct the machine that it will be very easy to clean.

The sixth object is to so construct the machine that the candy passing therethrough will be visible and accessible at all times during its passage through the machine.

The seventh object is to make all of the parts of the machine accessible and of such a nature as to be independent of extreme accuracy in construction or wear on parts.

The eighth object is to render the wrapping operation possible by moving the candy past the folding parts instead of moving the folding parts while the candy is held stationary, as is ordinarily the case.

The ninth object is to so construct the device that it will do away with sizing and cutting machines by performing these operations in the machine itself.

The tenth object is to keep all of the candy on top of a table instead of passing it through the machine.

The eleventh object is to provide a convenient form of feed mechanism capable of easy adjustment.

The twelfth object is to so construct the machine that it will reduce to the minimum the number of shafts, gears and parts requiring lubrication, in order to decrease the liability for such lubrication coming into contact with the candy and wrapping paper.

The thirteenth object is to provide positive and accurate stops for the cut-offs of paper and candy, thereby enabling these operations to be controlled or altered with great rapidity and continued with absolute uniformity as long as desired.

The fourteenth object is to provide a special mounting for the paper feed rolls to facilitate the handling of the paper so as to reduce the loss of time occasioned by tearing of the paper itself and also to insure uniform feeding of the paper through the machine as required.

Figure 2:
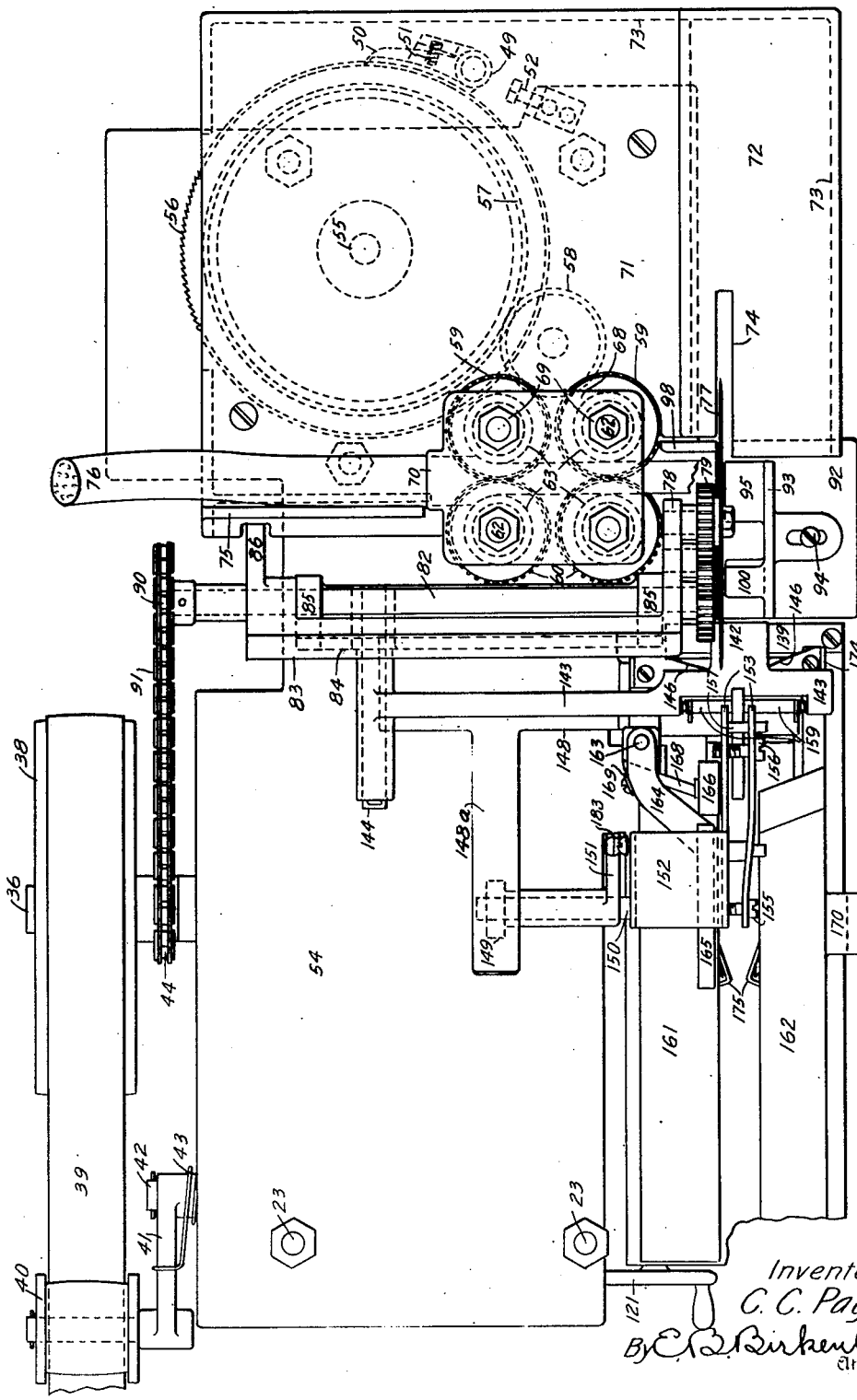
Figure 3:
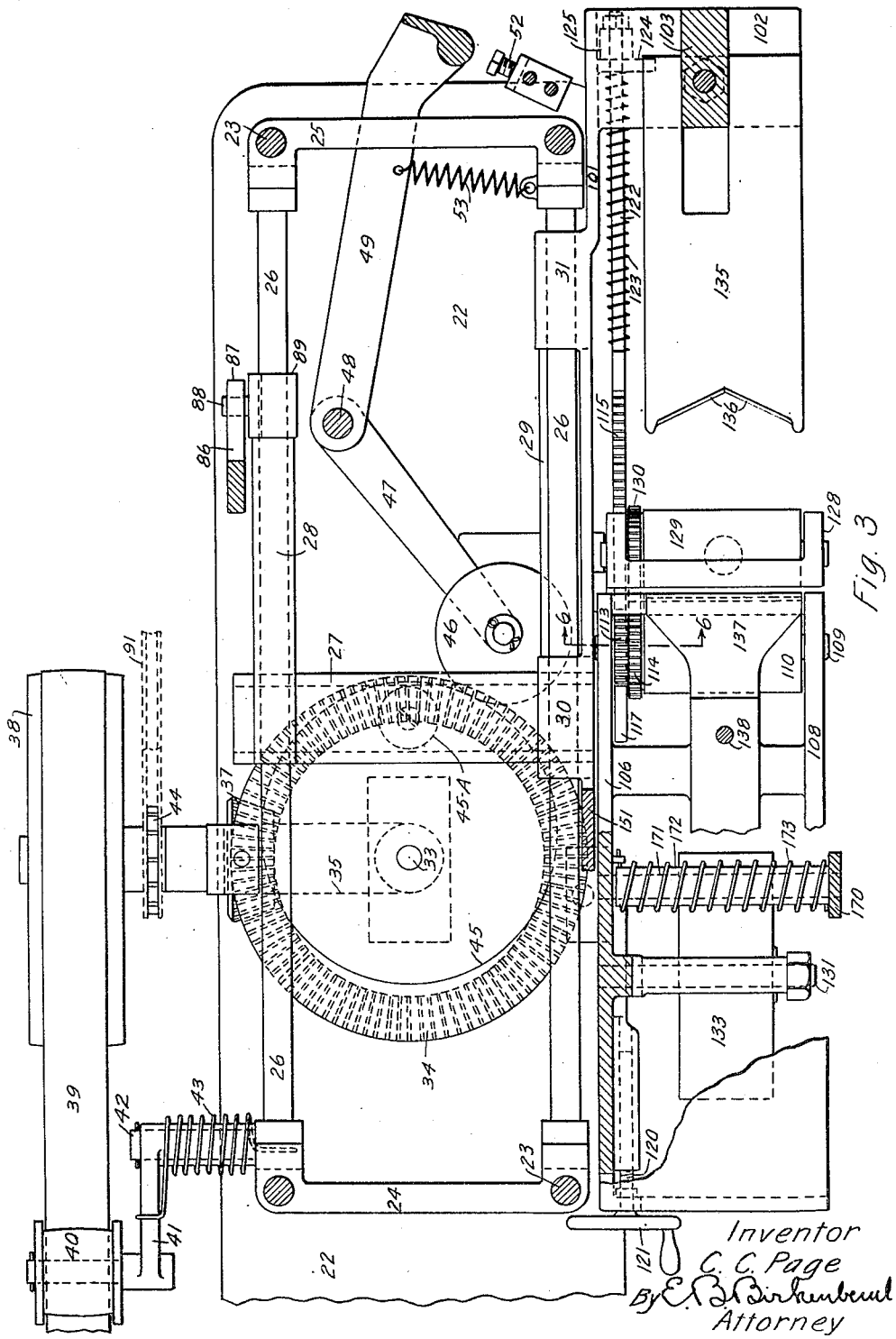
Figure 4:
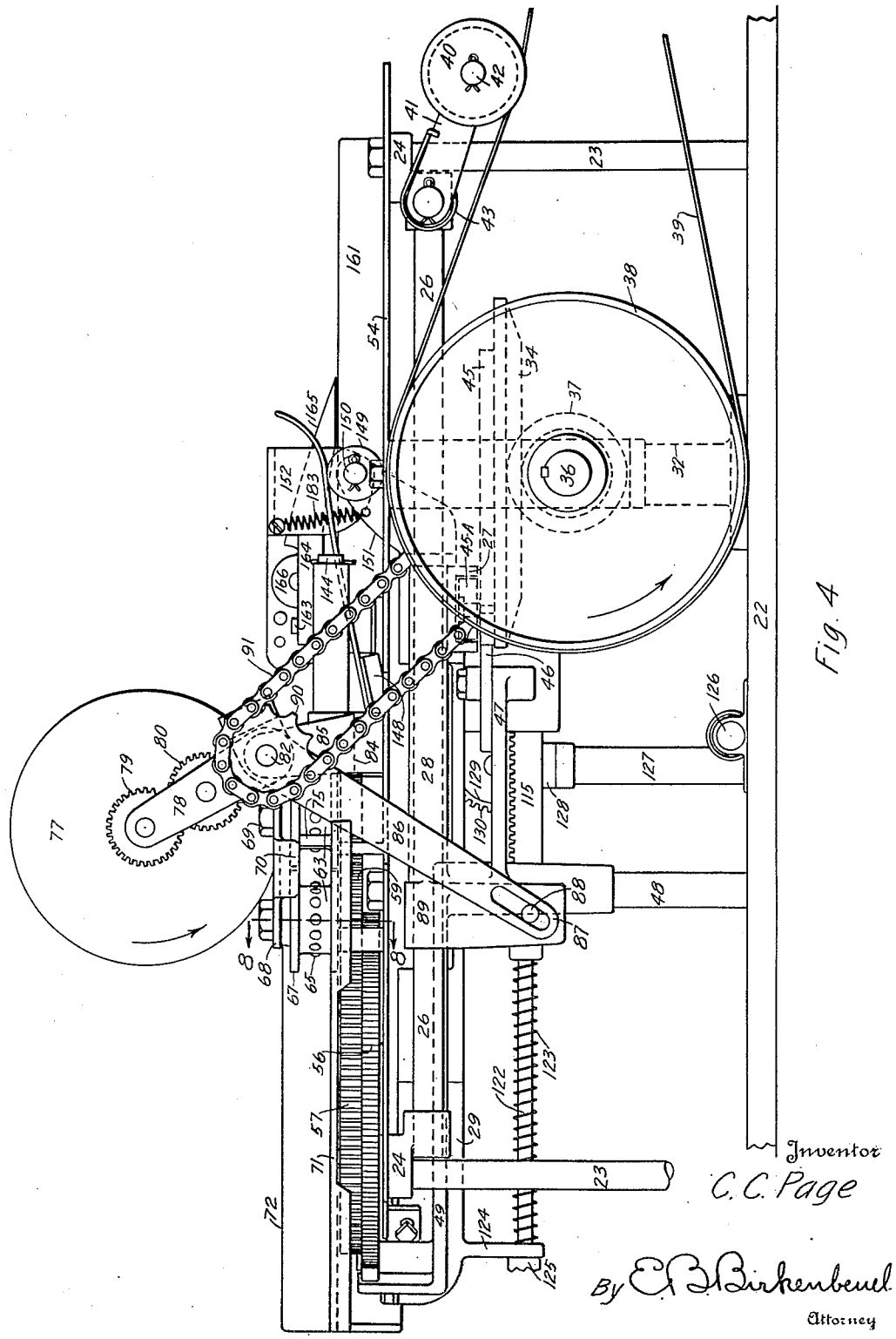
Figure 7:
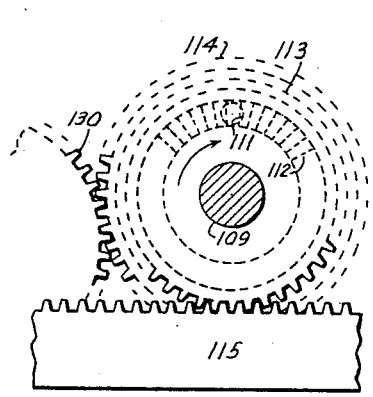
Figure 6:
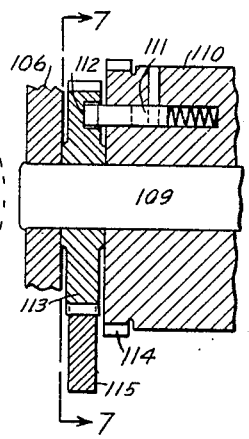
Figure 8:
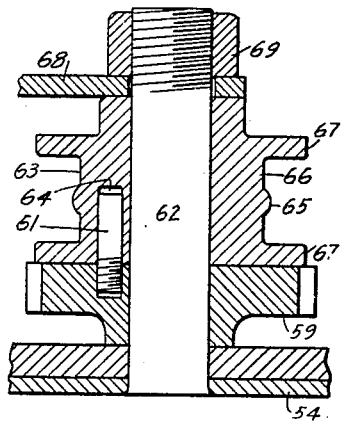
Figure 5:
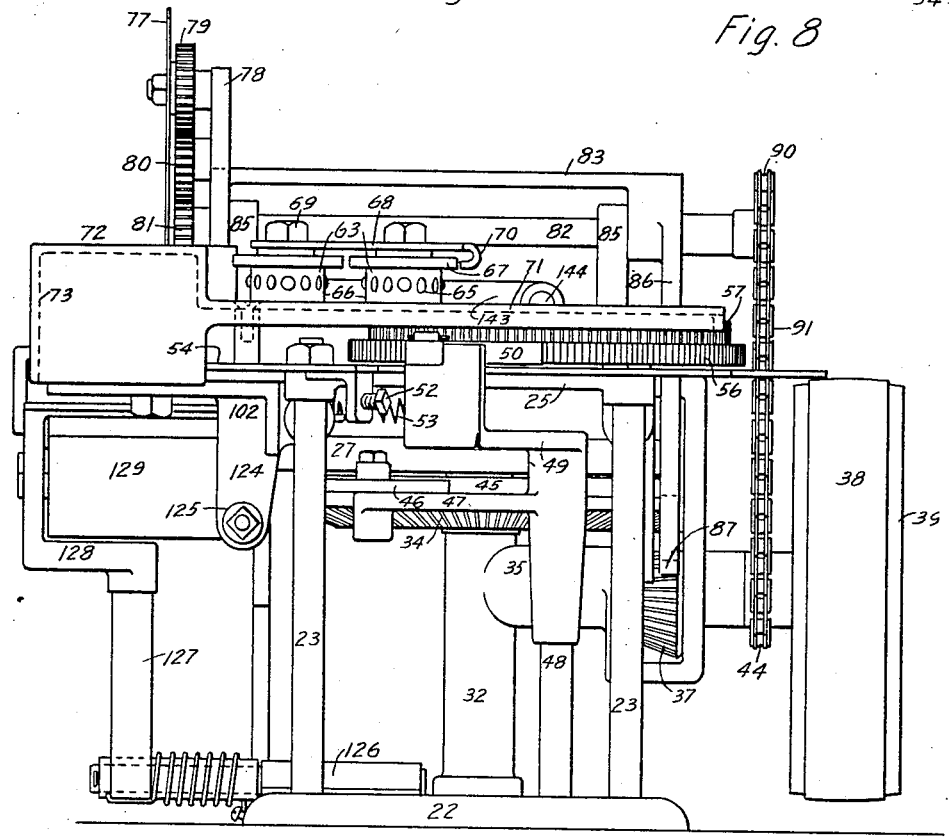
Figure 13:
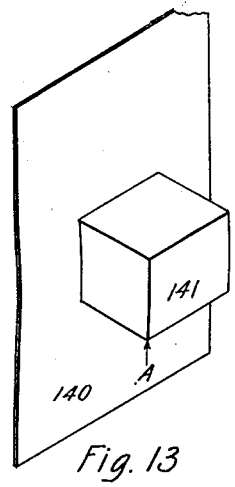
Figure 14:
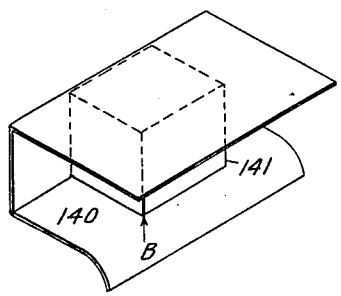
Figure 15:
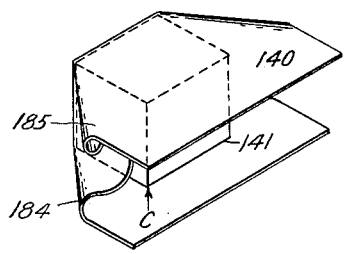
Figure 16:
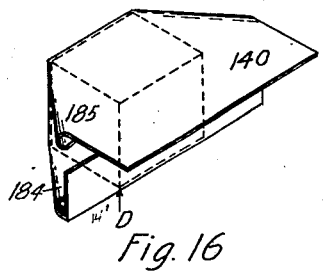
Figure 17:
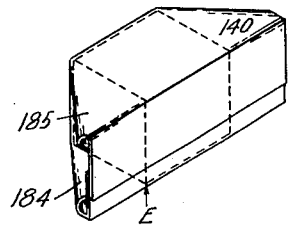
Figure 18:
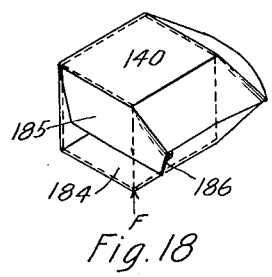
Figure 19:
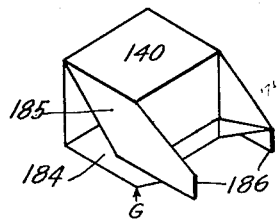
Figure 20:
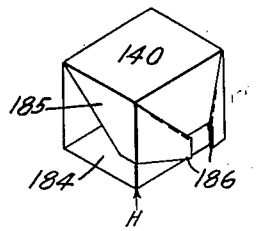
Figure 21:
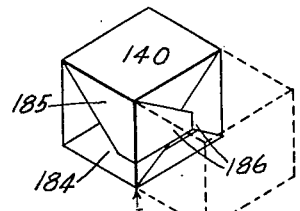

These, and other objects, will become more apparent from the specification following as illustrated in the accompanying drawings, of which:

Figure 1 is a front elevation of the machine. Figure 2 is a plan of the machine. Figure 3 is a horizontal section taken along the line 3—3 in Figure 1. Figure 4 is a rear elevation. Figure 5 is a right hand elevation. Figure 6 is a section through the paper feed roll drive taken along the line 6—6 in Figure 3. Figure 7 is a section taken along the line 7—7 in Figure 6. Figure 8 is a vertical section through one of the forming rolls taken along the line 8—8 in Figure 4. Figure 9 is an enlarged plan of the wrapping mechanism with portions broken away and other portions omitted in order to better show the working parts. Figure 10 is a vertical section taken along the line 10—10 in Figure 9. Figure 11 is a vertical section taken along the line 11—11 in Figure 9. Figure 12 is a vertical section taken along the line 12—12 in Figure 10. Figures 13 to 21 are perspective views of a piece of candy and wrapping paper in various relations which they assume during the course of wrapping, which are as follows: Figure 13 shows the candy first coming into contact with the paper in what will be referred to as the "A" position. Figure 14 shows the paper bent across the top and bottom sides of the candy at the "B" position. Figure 15 shows the paper bent around the middle in the "C" position. Figure 16 shows the paper with the bottom rear edge bent up in the "D" position. Figure 17 shows the paper with the top rear edge bent down in the "E" position. Figure 18 shows the first side bend performed by the stationary folding members at the "F" position. Figure 19 shows the second side bend made by the stationary folding members at the "G" position. Figure 20 shows the projecting ends of the wrapping paper bent across the back corners of the candy in the "H" position. Figure 21 shows the final operation of flattening the last bend being performed by the next following candy at the "I" position.

Similar numbers of reference refer to the same parts throughout the several views.

Referring in detail to the drawings, the entire machine is built upon a base 22 upon which are placed the upright posts 23 which are joined in pairs at their upper ends by means of the cross ties 24 and 25. Between the cross ties 24 and 25 are mounted the spaced guide rods 26 on which is mounted a slide consisting of a channel shaped cross frame 27, a tubular extension 28 and an elongated bracket 29 provided with the lugs 30 and 31 which receive the rod 26.

Attention is here drawn to the fact that nearly all of the operating mechanism is controlled directly or indirectly from the movement of the frame 27 and its attached parts.

Mounted on the base 22 is an upright standard 32 carrying a vertical shaft 33 on which is mounted a bevel gear 34. The upright standard 32 has a laterally projecting arm 35 which carries a horizontal shaft 36, whose inner end has secured thereto a bevel pinion 37 which meshes with the gear 34. A belt pulley 38 is mounted on the outer end of the shaft 36 and is driven through the belt 39 from any convenient source of power. An idler pulley 40 is mounted on the arm 41 on the stud 42 on the cross tie 24. A spring 43 is placed on the hub of the arm 41 to provide the desired tension for the belt 39. A sprocket 44 is also mounted on the shaft 36 between the belt pulley 38 and the arm 35.

On top of the gear 34 is placed a somewhat circular eccentric cam 45 against which rides the cam roll 46 mounted on the lever 47 pivotally mounted on the rock shaft 48, which also carries an arm 49 on which is mounted a pawl 50 provided with a spring 51. A roller 45—A is mounted on top of the cam 45 and moves in the channel shaped member 27. An adjustable stop screw 52 limits the movement of the arm 49 under the urging of the spring 53 which is attached to the cross tie 25.

A flat table 54 consisting of a thin plate of metal is mounted across the top of the ties 24 and 25, and it is over the top of this table that the candy passes during the various operations.

*Forming and feeding mechanism*

On top of the table 54 is mounted a stud 55 on which is rotatably mounted a ratchet wheel 56 which is engaged by the pawl 50 on the arm 49. Attached to the ratchet wheel 56 is a large spur gear 57 which meshes with an idler gear 58, which, in turn, meshes with two gears 59, which, in turn, mesh with the gears 60. Each of the gears 59 and 60 is provided with a stud 61 and is mounted on the stud bolt 62. On each of the gears 59 and 60 is placed a double flanged candy-forming roll 63 provided with holes 64 for the stud 61 for driving purposes. Projections 65 on the face 66 of each roll 63 insure against slippage between the candy and the roll 63.

The distance between the flanges 67 determines the thickness of the bar being formed, and the space between the faces 66 of a pair of rolls 63, which are driven by an intermeshing pair of gears 59, determines the width of the bar being formed. Various sizes of rolls 63 are provided to meet the particular requirements of the user.

A cover plate 68 is placed over the upper ends of the stud bolts 62 and is held in place by the nuts 69. One side of the cover plate 68 is provided with a downturned projection 70 whose under side guides the upper surface of the candy under the upper flanges 67 of the first pair of rolls 63 with which it comes in contact. A cover plate 71 covers the ratchet wheel 56 and the gears 57 and 58 and extends to the upper line of the lower flanges 67 of the roll 63. The plate 71 is provided with a raised portion 72, outer walls 73, a slot 74 in the raised portion 72 and a guide wall 75 alongside of which the incoming bar of candy 76 moves into the machine.

*Cut-off mechanism*

The pull stock or caramel strip 76 having been formed in square or oblong cross section by the rolls 63 and fed along under the movement of the pawl 50 a pre-determined distance controlled by the screw 52, it is evident that the formed bar must now be cut off.

The cut-off mechanism itself consists of a rotary knife 77 on the arm 78, which knife is driven by the gears 79, 80 and 81, the latter of which is on the shaft 82 which acts as a pivot for the arm 78 and its extension 83. A bracket 84 provided with the standards 85 supports the shaft 82 and its attached parts. On one end of the extension 83 is formed an arm 86 whose slotted end 87 receives the pin 88 attached by means of a sleeve 89 to the tubular extension 28.

A movement of the tube 28 along the rod 26 rocks the shaft 82 and causes the knife 77 to sweep across the discharge end of the forming rolls, as shown in the dotted position in Figure 1.

A sprocket 90 is connected by means of a chain 91 to the sprocket 44 which causes the knife 77 to be rotated in the direction indicated whenever the belt pulley 38 is rotated. The knife 77 in its downward travel passes partially into the slot 74 of the cover plate 71.

On the projection 92 of the table 54 is mounted an adjustable stop 93 which is held in the desired position by means of the screw 94. The stop 93 is provided with a ledge 95 upon which the cut off candy falls.

A block 96 of the same height as is the cover plate 71 is secured in front of the discharge end of the rolls 63 and is attached by means of a screw 97 which passes into the table 54. The block 96 is provided with an upturned guide 98 and a second upturned guide 99 alongside of the knife 77. The stop 93 is also provided with an inturned lug 100 which prevents the pieces of candy from being carried upwardly by the knife 77.

*First mechanism for moving cut candy*

On the elongated bracket 29 is formed an extension 101 from which projects the transverse arm 102 to whose upper side is attached a double plunger 103 whose upper arm 104 is used to push the freshly cut piece of candy off from the ledge 95 on to the table 54. The lower arm 105 is utilized to move the piece of candy which has previously been pushed off from the ledge 95 on to the table 54 along in its journey into the wrapping mechanism.

*Paper feed mechanism*

Under the front of the left hand end of the table 54 is secured an upright standard 106 whose lower end is mounted on the base 22 and whose upper horizontal side 107 is fastened under the table 54. The downturned side 108 on the member 107 serves as a bearing for the shaft 109 for the fixed rotatable paper feed roll 110. The feed roll 110 is provided with a spring-urged plunger ratchet 111 which engages the teeth 112 in the side of the gear 113. A gear 114 is formed integral with the roll 110. Either the gear 113 or the roll 110, or both, should be free to rotate on the shaft 109.

Meshing with the gear 113 is a rack 115 supported on its under side by a roller 116 and having an upturned end 117 adapted to engage an adjustable stop 118 slidably mounted on a pin 119 on the standard 106. A feed screw 120 can be operated by the hand wheel 121 and controls the position of the stop 118. The end 117 is upturned merely as a matter of convenience.

The opposite end of the rack 115 is provided with a rod end 122 over which is placed a spring 123 which bears against the bracket 124 on the under side of the member 102, which bracket also slidably supports the rod 122 and is provided at its end with a rubber bumper 125.

On the base 22 is mounted a horizontal stud 126 on which is pivotally mounted an upright sleeve 127 in which is pivotally mounted a forked frame 128 in which is journaled the movable paper feed roll 129. To the roll 129 is secured a gear 130 which meshes with the gear 114. The roller 129 is therefore capable of rotating on a vertical pivot and at the same time swinging on the stud 126, making it possible to easily move the rollers 129 and 110 apart for the purpose of inserting the paper or for cleansing purposes and also to insure a proper contact between the rollers along their entire length. The roll 129 is urged toward the roll 110 by means of a spring 126—A.

A stud bolt 131 carries a swinging arm 132 on whose lower end is mounted a roll of paper 133 from which a strip of paper 134 is lead upwardly between the rolls 110 and 129. After the strip of paper 134 leaves the rolls 110 and 129 it passes upwardly across the end 92 of the table 54, in the path of the piece of candy about to be wrapped. In other words, the rolls 110 and 129 feed the wrapper 140 to a position with relation to the candy 141 (as shown in Fig. 14).

*Paper cut-off mechanism*

Attached to the member 102 is a slotted paper knife 135 whose cutting edges 136 recede toward the center of the blade in order that sidewise movement will not be imparted to the paper being cut. The stationary blade 137 is secured to the under side of the member 107 by means of the screw 138.

*Wrapping mechanism*

Above the stationary blade 137 is a stationary folding bar 139 whose function it is to bend the lower portion of the piece of paper 140 across the under side of the piece of candy 141 as the candy is pushed along by the lower arm 105. A shoe 142 is formed on the side of the arm 143 which is pivotally mounted on the stud 144. The under side 145 of the shoe 142 is rounded to facilitate the bending operation which, at this stage, appears as illustrated in Figure 14. The curved lower edge is caused by the sharp bend around the bar 139.

A pair of flexible rubber fingers 146 are mounted in a horizontal plane across the path of travel of the candy and serve to fold the paper against the sides of the candy, as shown in Figure 15.

Hinged in a groove 147 in the bracket 84 is a flap folding blade 148 whose function it is to fold up the lower rear edge of the paper, as shown in Figure 16. This movement is accomplished by a roller 149 whose shaft 150 passes through the arm 151 on the member 29. The shaft 150 with its roller 149 are carried on the bracket 151 which slides longitudinally with the machine, and the roller 149 can move under the upturned end of the arm 148—A, thereby rocking said arm and its blade 148 for the purpose of folding up the lower rear edge of the paper as shown in Figure 16, as just described.

Second mechanism for moving cut candy

On the shaft 150 is mounted a U-shaped arm 152 provided with a pair of claws 153, the spacing of whose ends 154 can be adjusted by means of the screws 155 and 156. A pin 157 passes through both of the claws 153. The ends 154 of the claws 153 straddle the arm 158 which projects from the side of the arm 143. On each side of the arm 158 is hinged a gate 159 which is frictionally held in position by means of the springs 160.

Wrapping chute

The partially wrapped candy has now entered the wrapping chute which consists of a stationary side member 161 and a yielding side 162. The former has hinged near its forward end on the pin 163 a cam arm 164 over whose face 165 can ride the roller 166 on a claw 153, but which cam arm will be moved out of the way when the claws move in the opposite direction. In other words, the arm 164 is pushed laterally out of the path of the roll 166 by said roll upon the commencement of a backward movement of the roll, due to the fact that the arm 164 is pivotally mounted on a vertical pivot 163 which is off set from the path of the roll 166. The extreme end 167 of the member 161 serves as a support for one of the rubber fingers 146. A stop 168 is formed on the member 161 for the cam arm 164. A flat spring 169 urges the arm 164 toward the position shown in Figure 9.

The yielding side 162 of the wrapping chute is not secured to the table 54, but is slidably mounted thereon by means of an arm 170 which extends downwardly to the stud 171 on whose sleeve 172 is placed a spring 173 adapted to urge the member 162 toward the member 161. The end 174 of the member 162 supports the second rubber finger 146. Each of the members 161 and 162 is provided with a spring-urged gate 175 which folds into its respective side and permits the individually wrapped candy to pass. (See Figures 9 and 10). The gates 175 are merely yielding obstructions in the path of the wrapped candy whose function it is to fold the tips 186 of the wrapper to bend behind the candy at least sufficiently far to permit the next piece of candy to lay the tips 186 flat against the candy.

One of the most novel features of the device is best illustrated in Figures 9, 10 and 12 in which is shown the cutaway interiors of the members 161 and 162. There are several sloping faces in the cut-away portions, each of which has its separate function to perform in the wrapping of the candy, especially as illustrated in Figures 18 and 19. The sloping faces 176 (of which there is one on each of the members 161 and 162) extend from the inner side of the chute to the walls 177 and 178. Underneath each sloping face 176 is an upturned flange 179 supported by the bottoms 180, which extend to the walls 177 and 178. The upper side of the flange 179 is provided with two sloping faces 181 and 182, the latter of which is parallel with and a short distance from the face 176.

A spring 183 is employed to hold the claws 153 downwardly.

The operation of the device is as follows: A supply of paper is placed on the arm 132 and threaded between the paper feed rolls 110 and 129, as shown in Figure 1. A supply of pull stock or caramel stock which has been cut to approximately the cross section of the desired size to be wrapped, is now brought up to the forming rolls 63 and the machine started by means of an electric switch, if a motor is employed.

While a number of different operations are being performed on different pieces of candy at the same time, in order to make the explanation more clear the different operations performed in the wrapping of one piece only will be explained here, it following that the operations on other pieces passing through the machine at the same time merely being earlier or later in sequence, as the case may be.

Assuming that the machine is now under way and the gear 34 is in continuous operation, it follows that the frame 27, through the roller 45—A, will reciprocate continuously and the arm 49 will also be rocked continuously. Depending upon the position of the screw 52 the pawl 50 will travel over a certain number of teeth in the ratchet 56 in one direction, and rotate the gear 57 in the opposite direction, thereby causing the forming rolls 63 to rotate a pre-determined amount and, of course, form and feed an exact length of candy under the knife 77, which is continuously rotating and is timed to move downwardly through the candy at the proper time.

The arm 104 now moves along and pushes the freshly cut piece of candy off of the ledge 95 whereupon it falls first upon the pusher 105 and then as the pusher 105 is withdrawn upon the extension 92 of the table 54 and, at the next movement of the arm 105, is carried along against the paper 140, which is simultaneously cut off by the paper knife 135 which travels along with the arm 105. The candy 141 has now reached the position indicated at "B" and appears as is shown in Figure 14. Further movement of the arm 105 pushes the candy 141 past the rubber fingers 146 causing them to bend the central portion of the projecting ends of the paper against the sides of the candy, as shown in Figure 15. This takes place at the position "C".

Just about this time the direction of travel of the member 27 is reversed, which causes the roller 149 to raise the arm 148—A of the folding blade 148 and to fold up the under rearward edge of the paper, as shown in Figure 16 when the candy is in the position "D".

The roller 166 now rides upon the surface 165 and raises the claws 153 upwardly until the roller drops off of the end of the surface 165. The claw 153 now drops by gravity and the ends 154 now push the gates 159 downwardly making the fold shown in Figure 17 at the "E" position. The ends 154 of the claws 153 are now behind the fold in the wrapping, and at this point the claws start back in the opposite direction carrying the partially wrapped candy before them.

In moving forward the lower folds 184 ride on the surfaces 181 and are folded upwardly, as shown in Figure 18 in "F" position.

Continued movement now causes the upper folds 185 to engage the surfaces 176 and to be folded downwardly thereby, as shown in Figure 19 which would take place at the position "G". A still further movement of the candy causes it to pass between the gates 175 which close behind the candy and partially bend the tips 186 of the paper wrapping behind the candy. The claws 153 now start back to repeat the process with another piece of candy, which eventually comes up and presses against the tips 186, completely flattening them and pushing the first caramel further along the chute, from which it is finally packed into boxes.

While these operations are taking place the supply of paper must, of course, be taken care of, and this is regulated entirely by the position of the adjustable stop 118 since it determines the distance which the spring 123 can move the rack 115 when the bracket 124 moves in the direction of the paper rolls. In other words, the distance between the end of the member 117 and the stop 118 receives the actual amount of movement imparted to the paper feed rolls, or rather, a proportional amount thereto. In other words, the position of the stop 118 is adjustable and the bracket 124 moves a fixed distance due to the fact that it is part of the member 102 and that the spring 123 moves the rack 115 until it strikes the stop 118, making the travel of the rack 115 accurately adjustable. In the return movement the rack 115 is idle until the nut 125 engages the bracket 124, which causes the rack 115 to drive the gear 113 in a direction which will drive the paper feed roll 110 (see Figure 6). This makes it possible to accurately control the length of paper fed by the machine, it being understood that the return stroke of the rack 115 is the feeding stroke.

When the bracket 124 moves in the opposite direction, or away from the paper feed rolls, the first portion of its movement is idle until it comes in contact with the bumper 125, after which it begins to rotate the gears which drive the paper feed rolls and cause a definite amount of paper to be fed upwardly across the path of the oncoming caramels.

In order to facilitate the understanding of the various operations which take place on this machine, the appearance of the candy and wrapping has been illustrated at the close of each operation by a separate figure, namely from 13 to 21 inclusive, and in each case a letter with an arrow at the corner of the candy and a corresponding letter and arrow located on the drawings of the machine show the exact position at which a candy is undergoing a particular operation.

It is a well understood fact that candies have long been wrapped by machines; such machines are therefore not claimed broadly, but it is my intention to cover all such forms and modifications thereof as fall fairly within the appended claims.

I claim:

1. In a candy wrapping chute, the combination of a table; a pair of guides mounted on said table, each of said guides having a recess formed in one side, said recess having a sloping undercut roof, said undercut portion having a floor under said sloping roof, said floor having an upturned flanged wall sloping in opposite directions, one of said slopes being parallel with said roof and slightly spaced therefrom.

2. In a candy wrapping chute, the combination of a table; a stationary guide mounted on said table; a movable guide spaced from said stationary guide and parallel therewith; a hinged claw slidably mounted over said chute; and a cam between said claw and chute adapted to raise said claw in one direction and allow it to drop at the end of the stroke and to return to the point of beginning in a lowered position.

3. A chute for candy wrapping machines consisting of a table; a stationary guide mounted on said table; a movable guide spaced from the stationary guide and held parallel therewith; and yielding rubber fingers on the inlet side of said chute, said fingers pointing horizontally toward the center of said chute and toward each other, each of said guides having an undercut portion having a sloping roof and also having a floor under said roof, said floor having an upwardly turned flange whose top slopes in both directions, one of said sloping edges being parallel to and spaced from said roof.

4. A wrapping machine having, in combination, a table; a fixed guide on said table; a movable guide parallel with said fixed guide and urged toward same by a spring; a pair of discharge gates adapted to close behind a wrapped candy as it is pushed through said gates; sloping faces formed in said guides for forming the diagonal folds on a candy; a swinging cam mounted on said fixed guide; a hinged shoe at the inlet to the chute formed by said guides, said shoe having an arm projecting therefrom along the center of said chute; a reciprocating double claw member hingedly mounted over said chute and having a roller on one side thereof adapted to ride on said cam and raise said claws while traveling toward said shoe and to drop said claw astride said shoe arm when nearest said shoe; and a pair of frictionally held gates on said shoe on opposite sides of said shoe arm, said gates being pushed downwardly by the falling claws and raised by candy passing under said shoe.

5. In a candy wrapping machine the combination of a paper feeding mechanism for wrapping rectangular pieces of candy consisting of means for positioning a longitudinal strip of paper against the first side of the candy in a manner that the edges and ends of the paper will project beyond the candy, means for folding the ends of the paper against the second and third sides of the candy which are adjacent to the first side forming the paper wrapper into a U shape, means for bending the projecting portions of the U shape wrapping against the ends of the candy, means for folding the two ends of the paper against the fourth side of the candy, and means for bending and folding the projecting edges of the wrapping against said fourth side.

6. A method of wrapping cube candy consisting of progressively placing one side of a cube against an elongated strip of paper in a manner that the ends of the strip shall project equally beyond opposite faces of the cube and that the sides of the strip shall project equally beyond their adjacent sides of the cube, then folding the opposite ends of the paper flat against their adjacent cube sides, then bending the intermediate laterally extending portions of the paper against their respective cube sides, then folding both ends of said paper against the remaining cube side, then folding the laterally extending ears thus formed successively against their respective cube sides, and then folding the flattened ears against the last mentioned cube side.

CLARENCE C. PAGE.